United States Patent [19]

Weber

[11] 4,231,216
[45] Nov. 4, 1980

[54] MOWER WITH BOTTOM-DRIVEN CUTTER DISCS

[75] Inventor: Marcel Weber, Marmoutier, France

[73] Assignee: Societe Samibem, S.A., Marmoutier, France

[21] Appl. No.: 913,074

[22] Filed: Jun. 6, 1978

[30] Foreign Application Priority Data

Jun. 15, 1977 [FR] France .................................. 77-18776

[51] Int. Cl.³ .................... A01D 55/26; A01D 35/264
[52] U.S. Cl. ......................................... 56/13.6; 56/6; 56/12.6
[58] Field of Search .................. 56/12.3, 6, 13.6, 13.7, 56/192, 295, 12.6

[56] References Cited

U.S. PATENT DOCUMENTS

| | | | |
|---|---|---|---|
| 3,524,306 | 8/1970 | Reber | 56/12.3 |
| 3,783,533 | 1/1974 | Konig et al. | 56/6 |

*Primary Examiner*—Paul J. Hirsch
*Attorney, Agent, or Firm*—Young & Thompson

[57] ABSTRACT

Mower with an elongated housing supporting bottom-driven cutter discs and with a hollow stiffening beam inside the housing, the beam extending from the connection end of the housing and being situated between the axes of rotation of the discs and the rearmost positions of the elements pivoting the cutters to the discs, the beam extending the whole length of the housing and being filled with foamed synthetic plastics material.

3 Claims, 6 Drawing Figures

MOWER WITH BOTTOM-DRIVEN CUTTER DISCS

INTRODUCTION AND BACKGROUND OF THE INVENTION

The present invention relates to an advantageous improvement in mowers comprising bottom-driven discs.

In this type of mower, the transmission members which permit of driving the discs in rotation are situated beneath the discs. In order that the height of cutting of the fodder may be minimal the said driving members situated beneath the cutting elements of the mower must have the least possible thickness, and be connected to a support which must possess the same qualities. Moreover this support must ensure rigidity of the mower, even when the latter possesses a great working width.

In order to increase the rigidity of disc-type mowers having a great working width, it has been proposed to add to them a beam extending approximately over the discs in order not to impede the passage of the cut fodder flowing towards the rear of the machine by passing over its discs. This beam fast with the chassis of the machine can advantageously serve as support for a guard. However in order to fulfil its stiffening function correctly it must be connected to the free extremity of the mower which is closer to the still standing fodder, when the machine is in the working position. In this region the connection between the said beam and the mower, effected by means of an arm, interferes with good operation of the machine due to the fact that the cut fodder from the disc situated at the free extremity of the mower is in danger of accumulating at the level of the said arm, even to the extent of blocking the said disc. In that case use must be made of burdensome special deflectors of complicated forms, intended to facilitate the flow of the fodder cut in the zone of the outer disc of the mower.

The present invention aims at remedying the above-stated drawbacks by ensuring great rigidity for bottom-driven disc mowers, without thereby increasing their cutting height or impairing the flow of the cut fodder over the discs. The rigidity of these mowers must especially be ensured in the zone in which they are secured, either through the intermediary of a gear box to a hitch structure comprising means permitting their raising into a vertical position, or directly to the frame of a mower-conditioner, forage harvester or any other self-propelled or other machine permitting especially of cutting vegetation.

In a manner known per se, such a mower comprises bottom-driven discs possessing an elongated support housing for the discs, said housing being situated beneath the discs.

BRIEF SUMMARY OF THE INVENTION

With the purpose of increasing the rigidity of said housing the mower according to the invention comprises means situated beneath the discs, these means extending in the interior of the said housing at least in the zone of its end or ends by which the said housing is connected to a chassis or frame of a vegetation-harvesting machine.

This increase in the rigidity of the housing can be obtained without increasing the dimensions of the elongated housing. These dimensions are in fact already maximal so that the inherent bending resistance of the housing may be as great as possible, the dimensions of the latter remaining however compatible with good operation of the said mowers. In fact the said housing must be of a thickness as reduced as possible in order not to increase the cutting height.

Towards the front the installation of means according to the invention is not easy since the housing is prolonged by stone guards having a circular edge extending beneath the mower discs, slightly beyond the rotary path of the edges of the said discs but short of the rotary path of their cutters. Moreover the thickness of the forward part of the box of the mower must be very small in order that a certain inclination may be imparted to these machines in case of need.

As regards the rear edge of the housing of the disc mower, it is advantageous that it should be situated short of the securing screws of the cutters especially so that the latter may be dismantled without need for dismantlement of the respective discs.

FURTHER DESCRIPTION AND ADVANTAGES OF THE INVENTION

In further accordance with the invention the stiffening means are situated between the axes of rotation of the discs and the axes of the cutter-securing screws when the said screws are situated farthest to the rear on their rotary paths.

In further accordance with the invention the means intended to increase the rigidity of the elongated housing of disc mowers without reducing their performance are located within the said housing which extends progressively to the rear presenting a smooth wall with no unevenness. This moreover offers the advantage, over means which might fulfil the same functions but would be disposed outside the said elongated housing or elsewhere, that there is no danger of fodder debris remaining hooked to the said means or their securing elements.

According to one characteristic of the invention the members for securing the housing to the chassis or frame of the machine extend through the said means. Thus these members connect the housing to the chassis or frame in the zone in which the said housing is strongest. Moreover without departing from the scope of the invention it is also possible to provide that the said means extend over the whole length of the housing and that the securing members discussed above pass through the said means at least at the two ends of the housing.

According to the invention these means are for example constituted by a preferably hollow and closed section beam or the like, or by a beam of uniform strength, the said means being entirely located in the housing.

In accordance with another characteristic of the invention, and with the purpose of further slightly increasing the rigidity of the said housing and above all of attenuating the operating noise of disc mowers and of absorbing certain of their vibrations, the said housing and/or its hollow section are filled with an expanded synthetic plastics material.

The invention will be explained in greater detail hereinafter, with further characteristics and advantages, in the following description of several non-limitative examples of embodiment given with reference to the accompanying drawings,

BRIEF DESCRIPTION OF THE VIEWS IN THE DRAWINGS

FIG. 1 represents a plan view of the cutter bar of a disc mower according to the present invention, FIG. 2 represents an enlarged section along the line II—II in FIG. 1 of a first form of embodiment of the invention, FIG. 3 represents a view similar to FIG. 2 but showing a second embodiment of the invention, FIG. 4 represents a view similar to FIG. 2 but showing a third form of the invention, FIG. 5 represents an enlarged section along the line V—V in FIG. 6, and FIG. 6 represents a plan view of a disc mower cutter bar mounted in the frame of a vegetation harvesting machine.

DETAILED DESCRIPTION OF THE PREFERRED EMBODIMENTS

Figure 1:
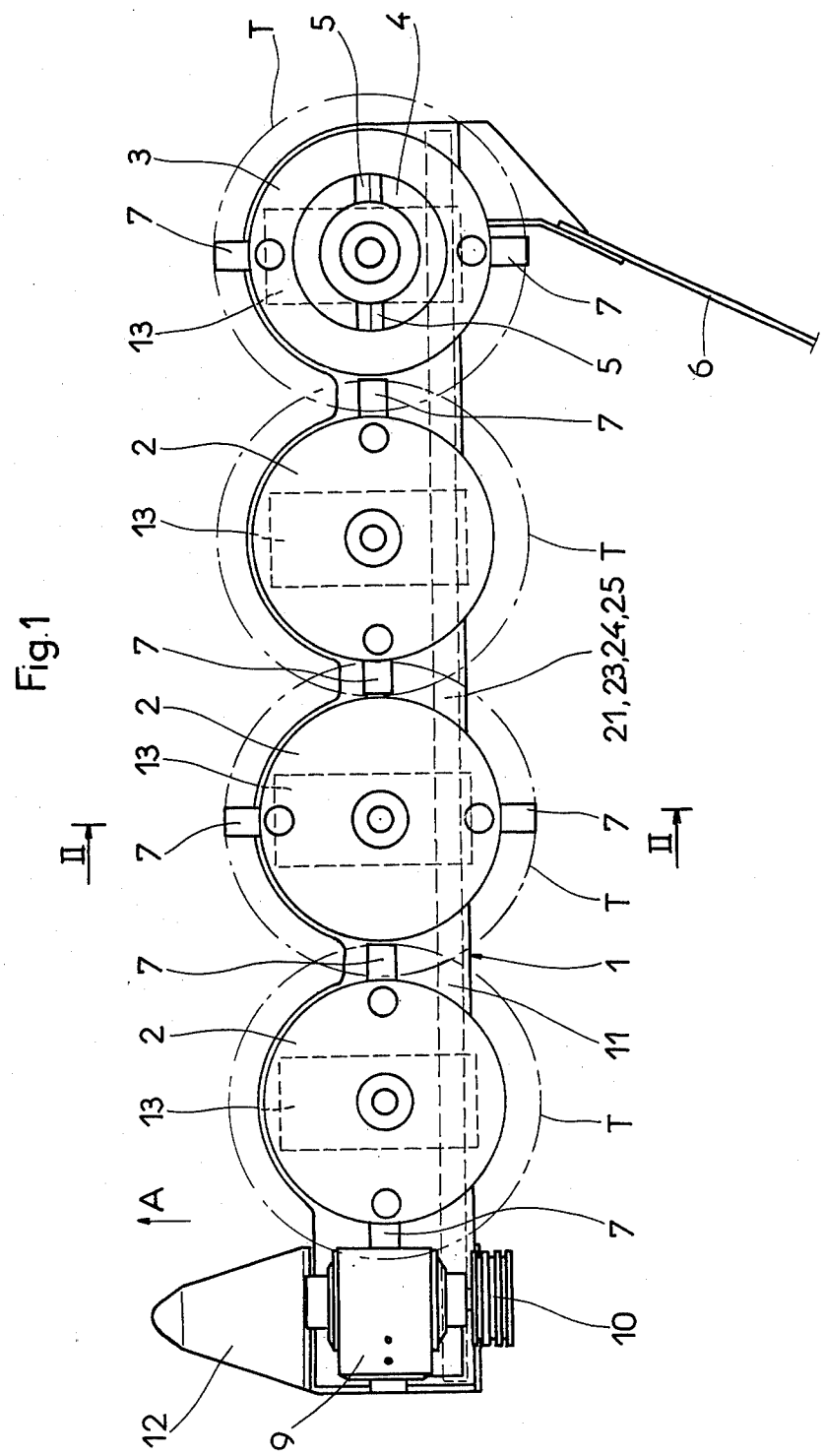

In the drawings, as represented in FIG. 1, the cutter bar 1 of a disc mower comprises four discs. Three of these discs 2 are alike while the fourth disc 3, situated at the end of the machine, is topped in a known manner by a frusto-conical element 4 provided with ribs 5. This element 4, in co-operation with a swath plate 6, serves to make a clear separation between the fodder cut by the cutters 7 of the disc 3 and the fodder still standing. Identical cutters 7 with which the discs 2 are equally equipped describe a rotary path T and are each fixed in an articulated manner to the discs 2 with the aid of a device 8 comprising a mounting screw 37.

The other end of the cutter bar, opposite to that where the swath plate 6 is situated, is provided with a gear box 9 containing transmission members which permit the imparting of rotating movement in appropriate directions to the discs 2, 3. These transmission members are themselves driven through the intermediary of a grooved pulley 10 extending behind the gear box 9, considering the machine in its direction A of travel. Without departing from the scope of the invention the drive of the discs 2, 3 of the mower can equally take place directly through one of the discs 2, 3.

In the normal operating position the cutter bar 1 is driven by a tractor and is connected thereto by a hitch structure, said tractor and hitch structure not being represented in the accompanying drawings. Thus in the normal operating position the cutter bar 1 slides on the ground. To limit wear on the elongated housing 11, the cutter bar 1 is provided with a shoe 12 disposed beneath the gear box 9, and with guards 13 disposed respectively beneath the discs 2, 3.

Figure 2:
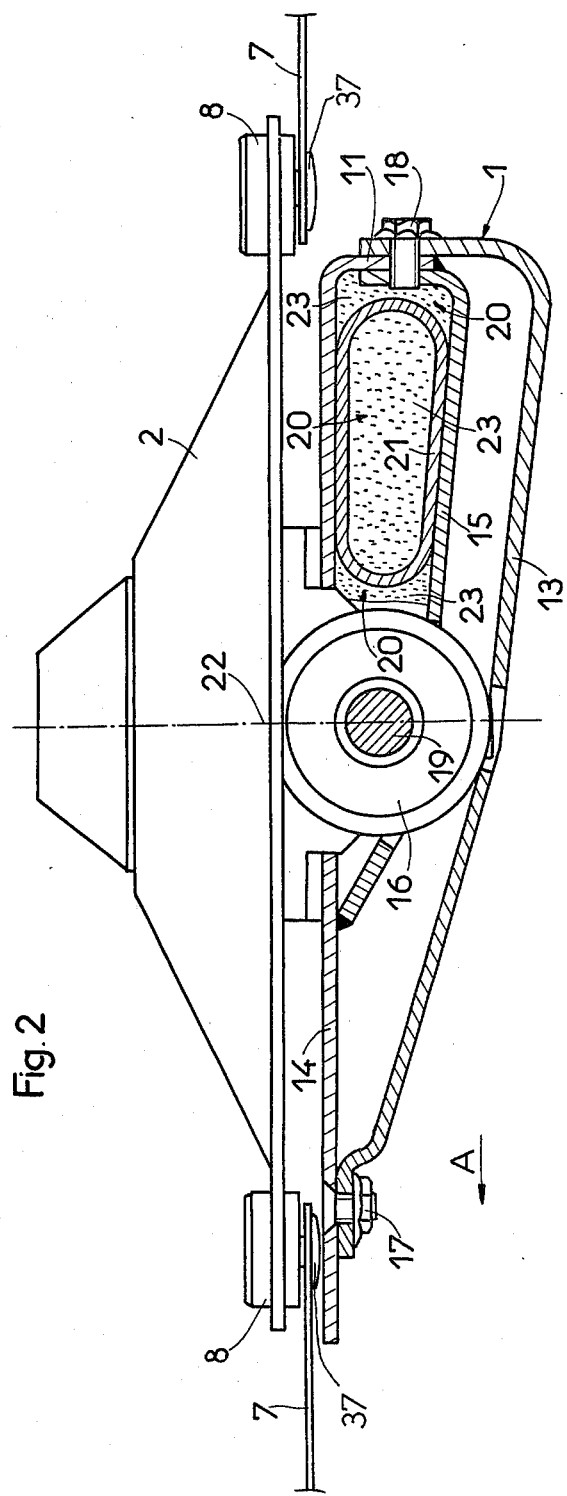

Referring now to FIG. 2, which represents an enlarged section of a first form of embodiment of the invention, it may be seen that the elongated housing 11 of the mower is composed of two L-shaped plates 14 and 15 connected with one another by welding. The guard 13 disposed beneath each circular housing 16 is secured to the elongated housing 11 by means of screws 17 and 18. It is therefore easily replaceable. In each circular housing 16 there is bevel gearing, one of the pinions of which is fast on each shaft on which the discs 2, 3 are mounted, while the other pinion is mounted on a shaft 19 extending through all the circular housings 16 of the mower. This shaft 19, which is driven in rotation by transmission members located in the gear box 9, extends outwardly to beneath the outer disc 3 of the mower in order to be able to drive all the discs 2, 3.

Each circular housing 16 secured on the plate 14 extends through the elongated housing 11 of the mower. However the housings 16 do not occupy the whole volume 20 defined by the assembly of the two plates 14 and 15 which extend over the whole length of the cutter bar 1. Thus in accordance with the invention it is possible to fill this volume 20 with means intended to increase the rigidity of the elongated housing 11. In FIG. 2 these means are constituted by a closed hollow section, in the present case a tube 21 suitably flattened to be capable of being disposed in the said housing 11 between the internal walls of the plates 14 and 15 and behind the axes 22 of the discs 2, 3.

In order to remain in position within the housing 11 the tube 21 can for example be welded to one of the plates 14 or 15.

As represented by dotted lines in FIG. 1, the tube 21 extends over the whole length of the cutter bar 1. However without departing from the scope of the invention this tube can extend only over a fraction of the length of the cutter bar 1, provided that it is at least situated at the level of the gear box 9 and the disc 2 closest thereto. It is in fact in the zone situated between these two elements that the flexion of the cutter bar 1 is most critical.

Closed hollow sections such as the tube 21 are particularly recommended since while increasing the resistance of the elongated housing 11 to flexion they give good resistance to torsion. Without increasing too much the weight of the cutter bar 1, this type of section increase mainly the torsion resistance of the elongated housing 11.

Moreover it has been observed in practice that it is advantageous to be able to remove the mounting screws 37 from the cutters by withdrawing them downwards from the discs 2, 3. This permits the use of a simple and reliable device, necessitating no particular tooling, for mounting the cutters 7.

Thus according to an advantageous characteristic of the invention the stiffening means 21, 24 and 25 are situated between the axis of rotation of each of the discs 2, 3 and the axes of the mounting screws 37 of the cutters 7 when the said screws 37 are situated furthest to the rear on their rotary paths.

With the purpose of further slightly increasing the flexion resistance and above all of attenuating the operating noise of the disc mower equipped in accordance with the invention, the hollow remaining volume 20 can be filled with an expanded synthetic material 23, so as to envelope the tube 21 completely. The latter can also be filled with such a material jointly or not with the rest of the volume 20.

The material filling the volume 20 and/or the tube 21 eliminates the drum resonance effect of the volume 20 and the tube 21, while further absorbing certain vibrations produced by the machine.

Figure 3:
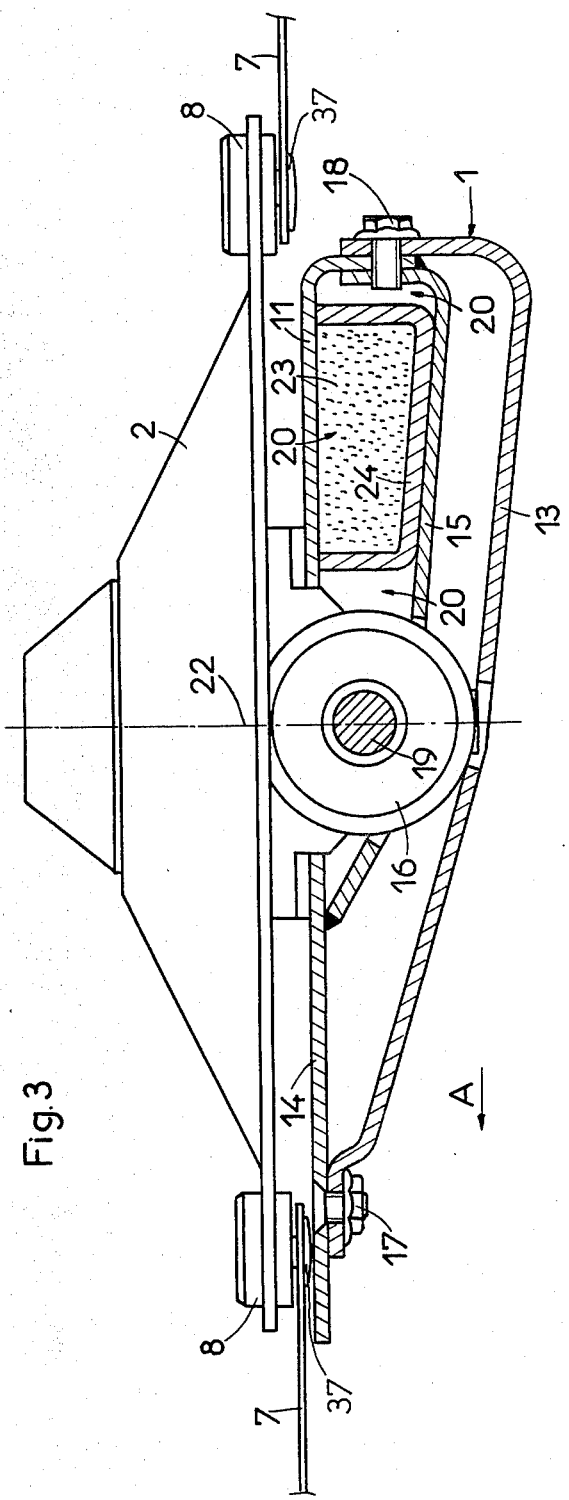

FIG. 3 represents another embodiment of the invention. In this variant the elements of the cutter bar 1 remain identical; only the form of the means intended to increase the rigidity of its elongated housing 11 is modified.

In FIG. 3 these means are constituted by a hollow open section 24 having the form of a U. This U-section 24 is situated at the same place in the elongated housing 11 as the tube 21. This U-section 24 is secured either to the plate 14 by welding or to the plate 15 by spot welding for example. This U-section 24 and/or the hollow remaining volume can likewise be filled, as described with reference to FIG. 2, with an expanded synthetic material 23. This material 23 then plays the same role as described with reference to FIG. 2.

Figure 4:
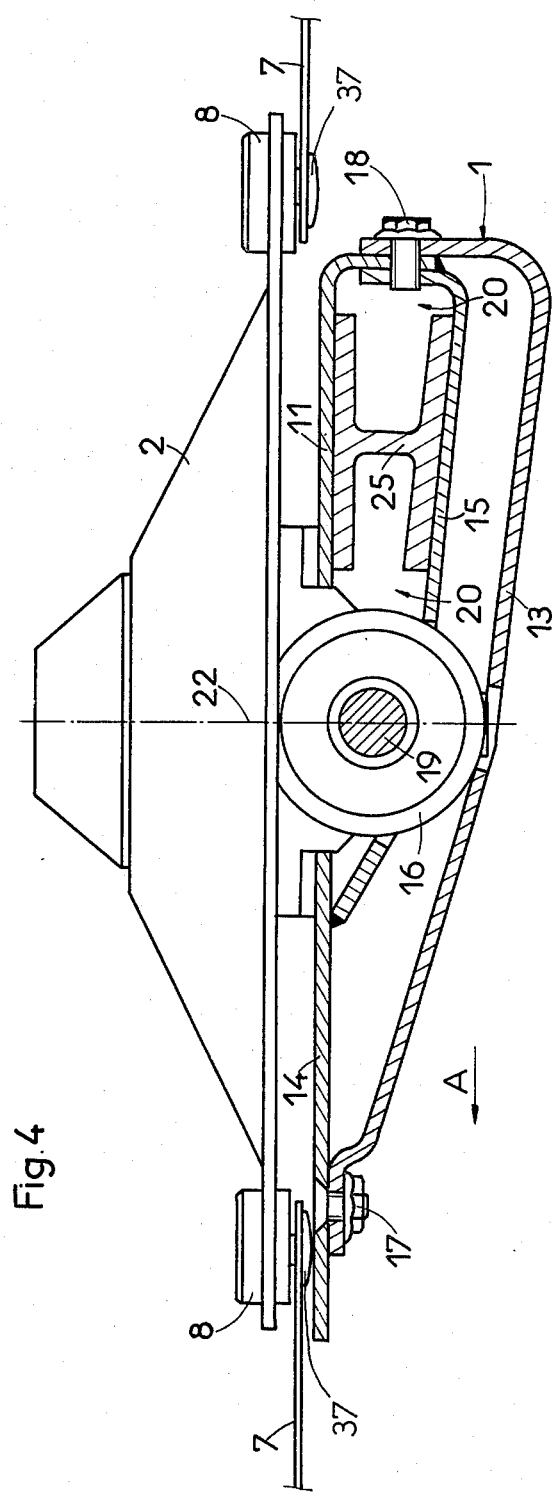

FIG. 4 represents another embodiment of the present invention. In this embodiment only the form of the means intended to increase the rigidity of the elongated housing 11 has been modified, the other elements of the housing 11 remaining identical.

In FIG. 4 the said means are constituted by an I-section 25 situated in place of the tube 21 or the U-section 24. The I-section 25 can likewise be enveloped with an expanded synthetic material in such manner as to fill the whole volume 20 situated behind the axes 22 of the discs 2, 3.

Without departing from the scope of the invention, the I-sections 25 can be very well replaced by an H-section (not shown) which could be installed in the elongated housing 11 under the same conditions and with the same purposes as the tube 21, the U-section 24 or the I-section 25.

Figure 5:
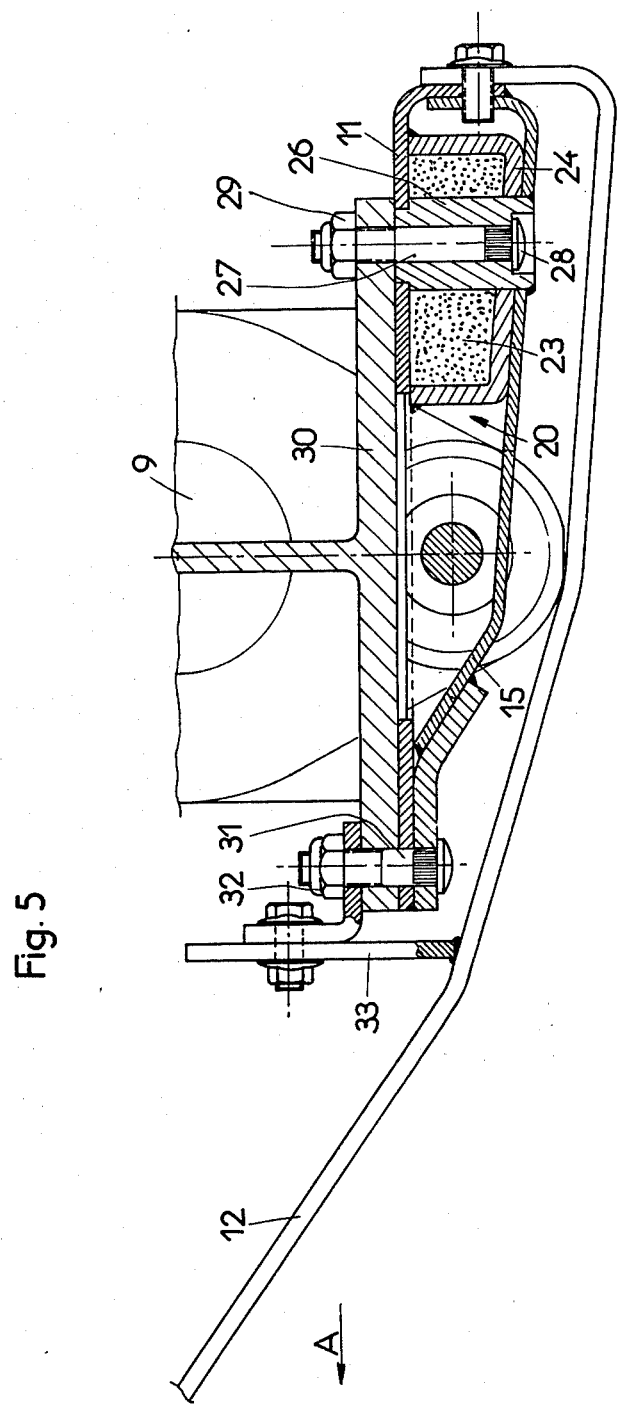

In FIG. 5 it can be seen that the securing members of the gear box 9 by which the mower is connected to its hitch structure pass through the housing, extending through a U-section similar to that described with reference to FIG. 3.

These securing members comprise sockets 26 through which pass screws 27. The heads 28 of these screws are embedded in the lower parts of the sockets 26 welded to the lower plate 15 of the housing. This avoids wear of the heads 28 of the screws 27 and prevents the catching of fodder debris. The nut 29 screwed on to each of the screws 27 bears upon the sole piece 30 of the gear box 9. At the front of the mower the box 9 is likewise secured to the elongated housing with screws 31 the nuts 32 of which permit the clamping upon the sole piece 30 of the box 9 of a lug 33 connected to the shoe 12 of the mower.

In the example of embodiment represented in FIG. 5 the nuts 29 and 32 of the screws 27 and 31 protrude. However they constitute no obstacle to the flow of the fodder since they are protected by the box 9 and the guard 13.

The above-mentioned securing members which pass through the means 21, 23, 24, 25 at least at the two extremities of the elongated housing 11 can likewise be applied to a machine provided with a section for example in the form of a flattened tube, as represented in FIG. 2.

Figure 6:
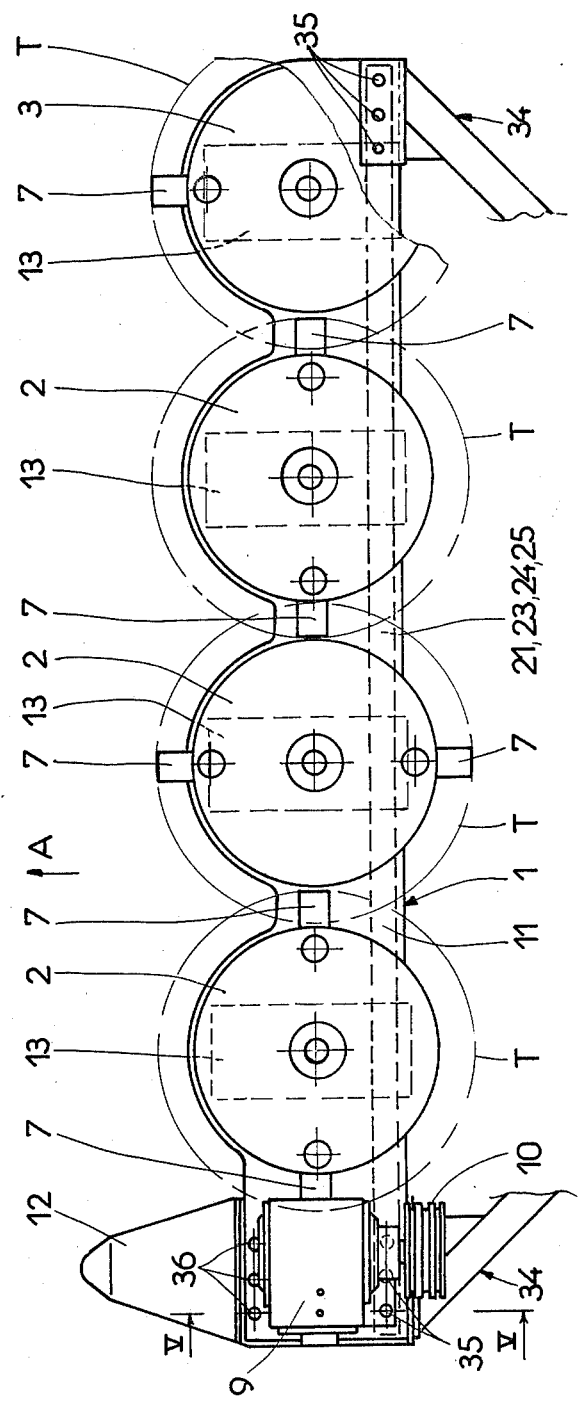

In FIG. 6 there is represented a plan view of the mower according to the invention, mounted in the frame 34 of a vegetation harvesting machine such for example as a mower-conditioner. In this FIG. 6 it can be seen that securing of the mower to the frame 34 of the mower-conditioner is effected by the ends of the mower and with screws 35 and 36. The screws 35 pass through the section 21, 24, 25 extending over the whole length of the mower support box. Thus the rigidity of the assembly is optimum, which is very advantageous in the case of a cutter bar having a great working width.

The nuts of the securing screws 35 situated at the right end of the elongated housing of the mower are advantageously countersunk to avoid any catching of fodder. In general in the other examples of embodiment of the invention it will also be possible to use countersunk hexagonal socket-headed screws for example.

It is quite apparent that various improvements, modifications or additions may be made to the various examples of embodiment described above, without thereby departing from the scope of the present invention.

What is claimed is:

1. A mower comprising a plurality of bottom driven discs, cutters on said discs, screws securing said cutters on said discs, an elongated housing disposed beneath said discs, transmission means in said housing for driving said discs in rotation, and a hollow beam for increasing the rigidity of said housing, said beam being disposed in the housing at least at one end of said housing, at least one of said beam and housing being filled with hardened expanded synthetic resin thereby to reduce drum resonance effect, means at said one end of said housing for connecting said mower to a drive vehicle, said beam being disposed between the axes of rotation of the discs and the axes of said screws when said screws are disposed farthest to the rear in their paths of rotation.

2. A mower as claimed in claim 1, in which said beam is filled with said hardened expanded synthetic resin.

3. A mower as claimed in claim 1, in which said beam and housing are filled with said hardened expanded synthetic resin.

* * * * *